United States Patent
Hammer

(10) Patent No.: US 9,586,626 B2
(45) Date of Patent: Mar. 7, 2017

(54) HOOD ASSEMBLY

(71) Applicant: Toyota Motor Engineering & Manufacturing North America, Inc., Erlanger, KY (US)

(72) Inventor: Jeremiah Thomas Hammer, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/968,953

(22) Filed: Dec. 15, 2015

(65) Prior Publication Data

US 2016/0096552 A1 Apr. 7, 2016

Related U.S. Application Data

(62) Division of application No. 14/304,452, filed on Jun. 13, 2014, now Pat. No. 9,248,866.

(51) Int. Cl.
| B60J 7/00 | (2006.01) |
| B62D 25/12 | (2006.01) |
| B62D 25/10 | (2006.01) |
| B60R 21/34 | (2011.01) |

(52) U.S. Cl.
CPC ............. B62D 25/12 (2013.01); B60R 21/34 (2013.01); B62D 25/105 (2013.01); *B60R 2021/343* (2013.01)

(58) Field of Classification Search
CPC . B60R 2021/343; B60R 21/34; B62D 25/105; B62D 25/12; B62D 25/16; B60K 11/08; Y10T 29/49622

USPC .... 296/193.11, 193.09, 191, 187.04, 187.09; 180/69.21, 69.2

See application file for complete search history.

(56) References Cited

U.S. PATENT DOCUMENTS

| 4,194,763 | A | | 3/1980 | Reidelbach et al. |
| 5,115,878 | A | | 5/1992 | Hayata |
| 5,131,710 | A | | 7/1992 | Kamiguchi et al. |
| 5,197,560 | A | * | 3/1993 | Oda .................. B60R 19/00 180/274 |
| 5,605,371 | A | * | 2/1997 | Borchelt ............. B62D 25/105 180/69.2 |
| 6,048,022 | A | * | 4/2000 | Ishibashi ............ B62D 21/15 180/69.2 |
| 6,260,609 | B1 | * | 7/2001 | Takahashi ............ B60K 11/04 165/67 |
| 6,883,627 | B1 | * | 4/2005 | Staines ............... B60R 21/34 180/69.2 |
| 7,052,075 | B2 | * | 5/2006 | Kamada ............... B62D 65/00 180/69.21 |
| 7,052,077 | B1 | | 5/2006 | Kalageros et al. |

(Continued)

*Primary Examiner* — Kiran B Patel
(74) *Attorney, Agent, or Firm* — Dinsmore & Shohl LLP

(57) ABSTRACT

A hood assembly is provided. The hood assembly includes an outer panel having an interior surface and a peripheral edge. The hood assembly further includes a frame mounted to the outer panel. The frame has a contoured section. The contoured section is spaced apart from the interior surface of the outer panel and adjacent a forward portion of the peripheral edge of the outer panel. The contoured section includes an opening disposed on the contoured section so as to facilitate a deformation of the outer panel from a top down load.

11 Claims, 8 Drawing Sheets

(56) References Cited

U.S. PATENT DOCUMENTS

| | | | |
|---|---|---|---|
| 7,052,079 B2* | 5/2006 | Endo | B62D 25/105 296/187.09 |
| 7,140,673 B2 | 11/2006 | Ito et al. | |
| 7,150,496 B2 | 12/2006 | Fujimoto | |
| 7,341,274 B2* | 3/2008 | Mori | B60R 21/36 180/274 |
| 7,354,101 B2* | 4/2008 | Donabedian | B62D 25/105 180/69.2 |
| 7,488,031 B2* | 2/2009 | Ishitobi | B60R 21/34 296/187.04 |
| 7,810,877 B2* | 10/2010 | Ishitobi | B60R 21/34 180/69.2 |
| 8,052,198 B2 | 11/2011 | Seksaria et al. | |
| 8,162,093 B2* | 4/2012 | Scheuch | B60R 21/38 180/271 |
| 8,167,071 B2* | 5/2012 | Thomas | B62D 25/105 180/69.2 |
| 8,186,743 B2* | 5/2012 | Anderson | B60J 5/042 296/146.6 |
| 8,205,699 B2* | 6/2012 | Ohzono | B60K 13/02 180/68.3 |
| 8,434,815 B2* | 5/2013 | Yoshida | B60R 21/34 296/187.04 |
| 8,485,588 B1 | 7/2013 | Voss et al. | |
| 8,534,410 B2 | 9/2013 | Nakaura et al. | |
| 8,740,291 B2* | 6/2014 | Hashimoto | B60R 21/34 180/69.2 |
| 8,827,358 B2* | 9/2014 | Rocheblave | B62D 25/105 180/69.2 |
| D718,686 S | 12/2014 | Hammoud et al. | |
| 9,027,987 B2* | 5/2015 | Ikeda | B62D 25/12 296/193.11 |
| 2001/0001994 A1* | 5/2001 | Enomoto | B60K 11/04 180/68.4 |
| 2002/0096378 A1* | 7/2002 | Kobayashi | B60K 11/08 180/68.6 |
| 2002/0171262 A1* | 11/2002 | Ozawa | B60R 21/34 296/187.05 |
| 2003/0121710 A1* | 7/2003 | Hamada | B60R 21/0136 180/274 |
| 2003/0141743 A1* | 7/2003 | Miyahara | B62D 25/105 296/146.1 |
| 2005/0280287 A1* | 12/2005 | Koura | B60R 21/34 296/193.11 |
| 2011/0308870 A1* | 12/2011 | Rasset | B62D 25/084 180/68.4 |
| 2012/0285759 A1* | 11/2012 | Ikeda | B60R 21/34 180/69.2 |
| 2015/0054305 A1* | 2/2015 | Steinhilb | B62D 25/105 296/187.04 |

* cited by examiner

HOOD ASSEMBLY

CROSS-REFERENCE TO RELATED APPLICATION(S)

This application is a division of U.S. patent application Ser. No. 14/304,452, filed Jun. 13, 2014, the details of which are incorporated by reference as if fully set forth herein.

FIELD

A hood assembly and a front end assembly is provided. Specially, the hood assembly includes an opening disposed on a contoured section of a frame so as to provide a predetermined deformation of the outer panel.

BACKGROUND

A hood assembly includes an outer panel and a frame mounted to an interior surface of the outer panel. The hood assembly may be part of a front end assembly of an automotive vehicle. In an automotive application, the hood assembly covers the engine compartment and is generally orthogonal to a grill. Currently, the frame includes a front portion which is configured to seat with a top surface of a front end assembly so as to reduce noise. Accordingly, the frame may include contoured sections which extend generally radially away from the interior surface of the outer panel. The contoured sections reinforce the outer panel. However, it remains desirable to provide the outer panel with a predetermined deformation from a top down load.

SUMMARY

In one embodiment, a hood assembly having an outer panel configured to execute a predetermined deformation upon a top down load is provided. The outer panel has an interior surface and a peripheral edge. The hood assembly further includes a frame mounted to the interior surface of the outer panel. The frame includes a contoured section. The contoured section is spaced apart from the interior surface of the outer panel and adjacent the peripheral edge. The frame includes an opening disposed on the contoured section so as to facilitate a deformation of the outer panel from a top down load.

In another embodiment, a front end assembly for use in an automotive vehicle is provided. The front end assembly includes a grill and a hood assembly. The grill is disposed on a generally vertical plane. The grill includes a top surface and a top edge raised above a forward portion of the top surface. The hood assembly is generally orthogonal to the grill. The hood assembly includes an outer panel having an interior surface and a peripheral edge. The peripheral edge includes a forward portion. The forward portion is spaced apart from and opposite the top edge of the grill and is generally disposed above the top surface of the grill.

The hood assembly further includes a frame mounted to the interior surface of the outer panel. The frame includes at least one contoured section. The contoured section is spaced apart from the interior surface of the outer panel and adjacent the forward portion of the peripheral edge. The frame includes an opening disposed on each of the contoured sections so as to facilitate a predetermined deformation of the outer panel from a top down load.

These and additional features provided by the embodiments described herein will be more fully understood in view of the following detailed description, in conjunction with the drawings.

BRIEF DESCRIPTION OF THE DRAWINGS

To complement this description and in order to aid in a better understanding of the characteristics described herein, a set of illustrative and non-limiting drawings is included as follows.

DETAILED DESCRIPTION

Embodiments described herein generally relate to hood assemblies and front end assemblies. In particular, the hood assembly includes an outer panel and a frame disposed on the interior surface of the outer panel. The frame has at least one contoured section. The contoured section includes an opening so as promote a predetermined deformation of the outer panel upon receipt of a top down load. As used herein, a top down load describes a load exerted onto the exterior surface of the outer panel which originates from a space above the outer panel. The top down load may be directly above the outer panel or may approach the outer panel at an angle, such as 50 degrees with respect to the ground.

The front end assembly may be mounted to the front of an automotive vehicle. The front end assembly includes a grill and a hood assembly having an outer panel configured to execute a predetermined deformation upon receipt of a top down load. Various embodiments of the hood assembly and the front end assembly and the operation of the hood assembly and the front end assembly will be described in more detail herein.

Figure 1:
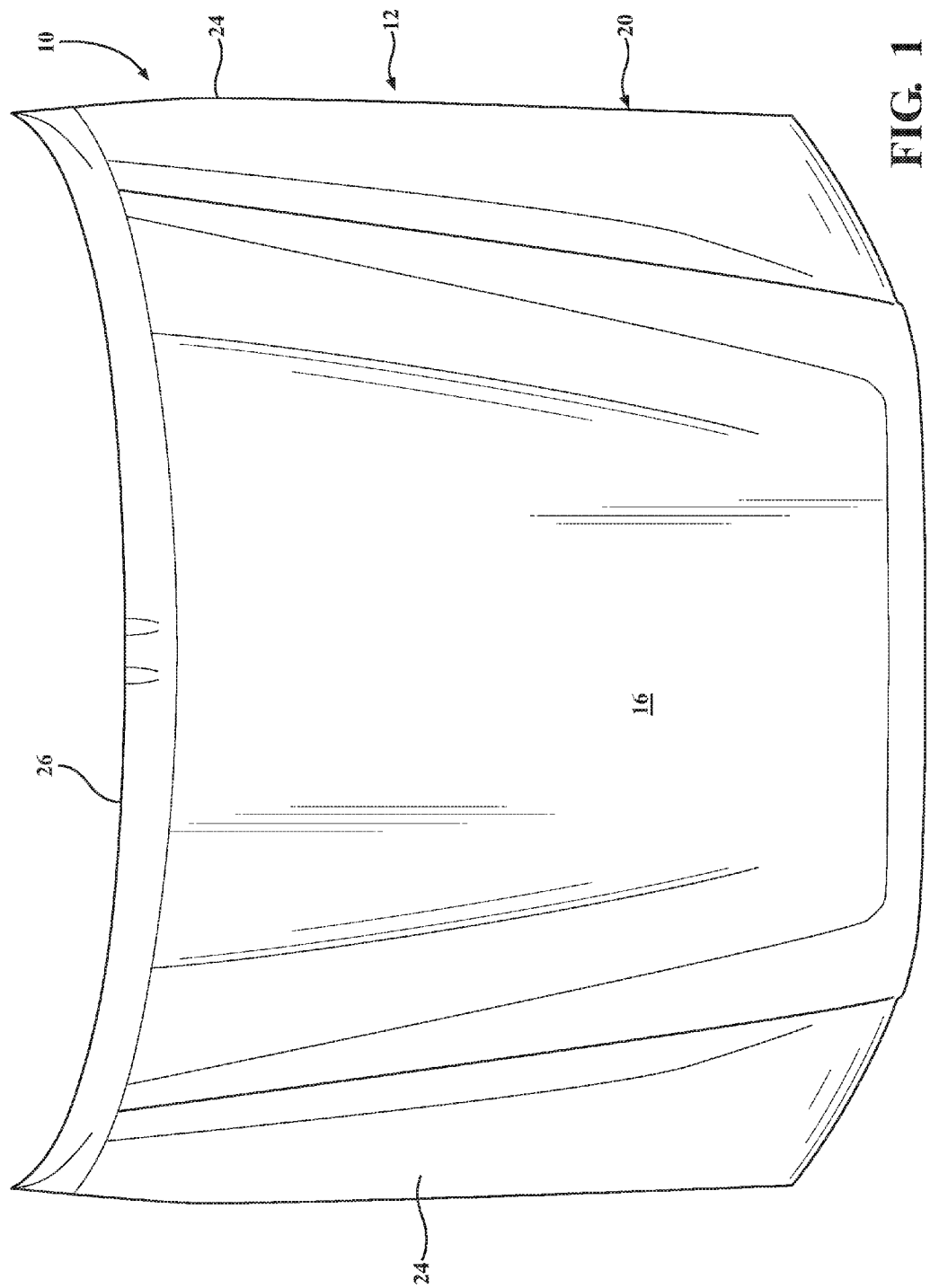
FIG. 1 is a top down view of an illustrative embodiment of the hood assembly.

With reference now to FIG. 1, a top down view of the hood assembly 10 is provided. The hood assembly 10 includes an outer panel 12 and a frame 14. The outer panel 12 may be formed of a generally rigid and durable material such as steel, or aluminum. However, it should be appreciated that other material such as fiberglass, carbon fiber or dry carbon may be used to construct the outer panel 12. The frame 14 may be fixed to the outer panel 12 using known fastening techniques such as spot welds, or a mastic adhesive applied at various locations between the frame 14 and outer panel 12.

The outer panel 12 includes an exterior surface 16, shown in FIG. 1, and an interior surface 18 opposite of the exterior surface 16. The outer panel 12 is generally rectangular in dimension and includes a peripheral edge 20. The peripheral edge 20 includes a forward edge portion 22, a pair of side portions 24 opposite of each other, and a rear portion 26. The midsection of the outer panel 12 may be raised relative to side portions 24. The forward edge portion 22 of the outer panel 12 may be bent away from the exterior surface 16.

Figure 2:
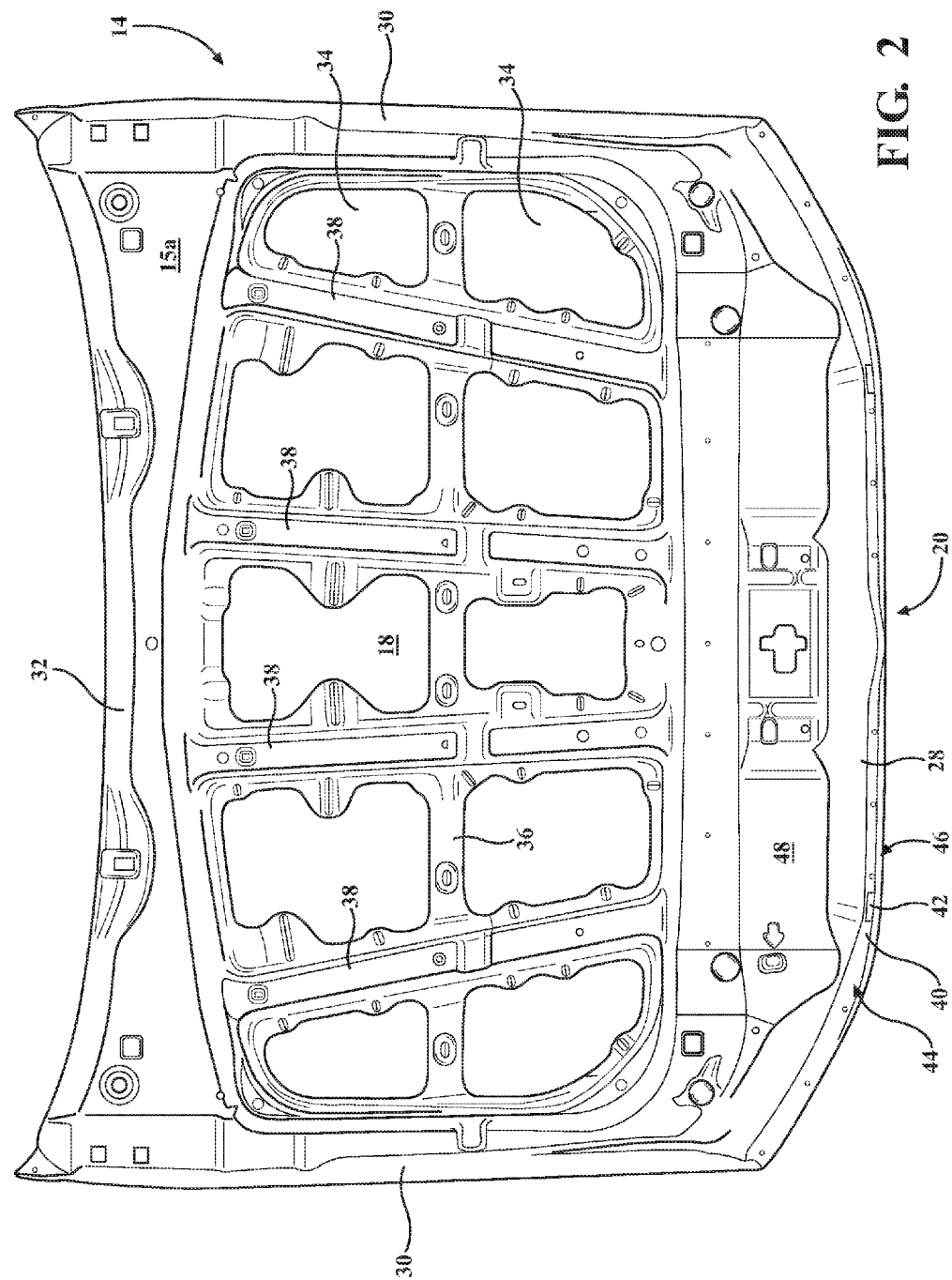
FIG. 2 is a view of an illustrative embodiment of the first surface of frame.
Figure 3:
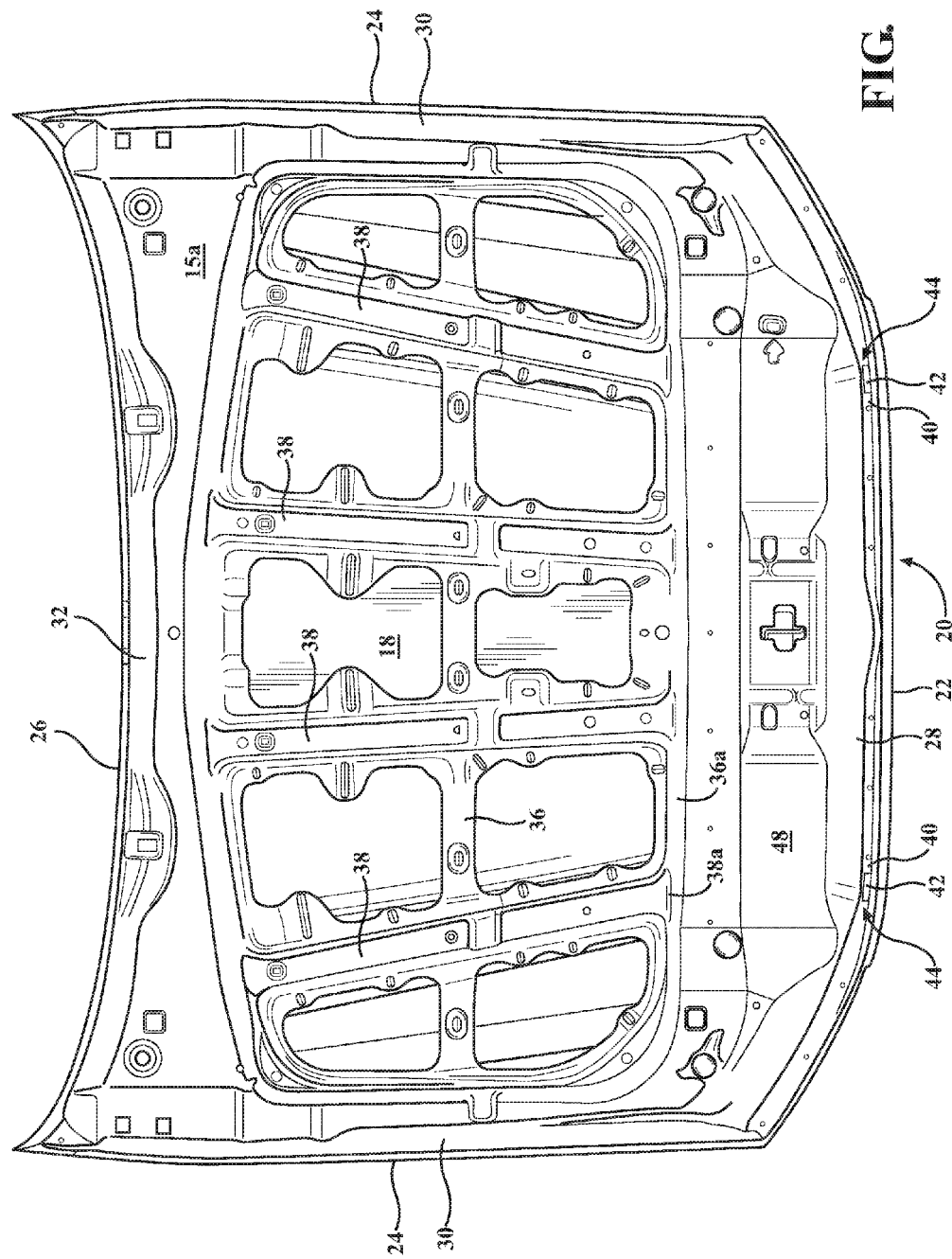
FIG. 3 is a view of the frame of FIG. 2 mounted to the outer panel.

With reference now to FIGS. 2 and 3, the frame 14 is mounted to interior surface 18 of the outer panel 12. The frame 14 may be formed of a generally rigid and durable material such as steel, or aluminum. However, it should be appreciated that other material such as fiberglass, carbon fiber or dry carbon may be used to construct the frame 14. The frame 14 is configured to provide structural support to the outer panel 12.

FIG. 2 is a perspective view of the frame 14. In particular, FIG. 2 shows the first surface 15a of the frame 14. The first surface 15a is opposite a second surface 15b. When mounted to the outer panel 12, the second surface 15b faces the interior surface 18 of the outer panel 12. FIG. 3 shows the frame 14 mounted to the interior surface 18 of the outer panel 12. The first surface 15a of the frame 14 is shown, and when mounted to an engine compartment (not shown), the first surface 15a faces the engine compartment.

The frame 14 includes a front edge portion 28, a pair of frame side portions 30, and a back portion 32. The center of the frame 14 may include a plurality of cut outs 34, defining a first cross member 36 extending between the pair of frame side portions 30, and a plurality of second cross members 38, each spaced apart from each other, and each extending between the front edge portion 28 and the back portion 32.

Figure 4:
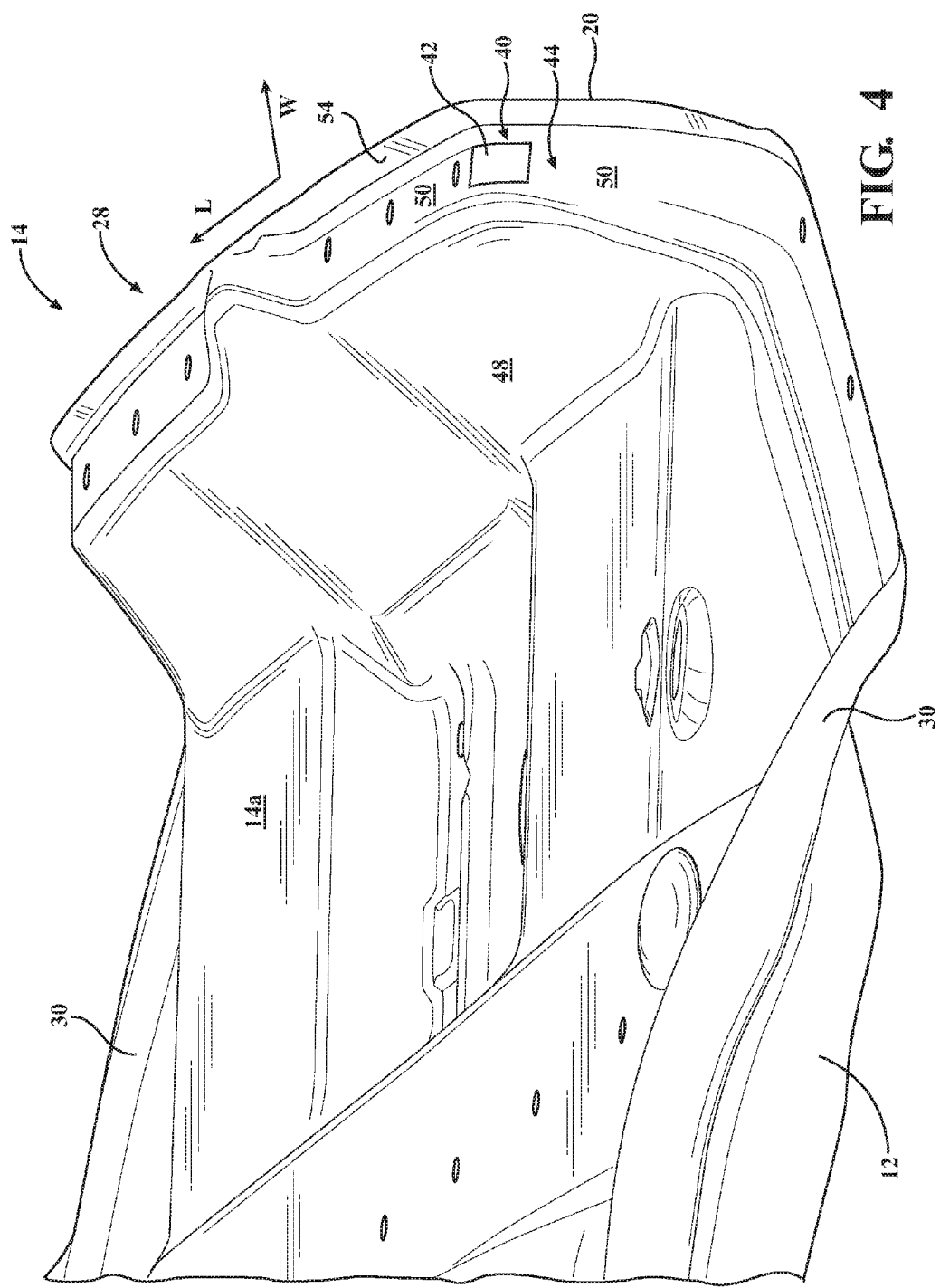
FIG. 4 is a perspective view of the second surface of the frame, showing the contoured section and the opening.
Figure 5:
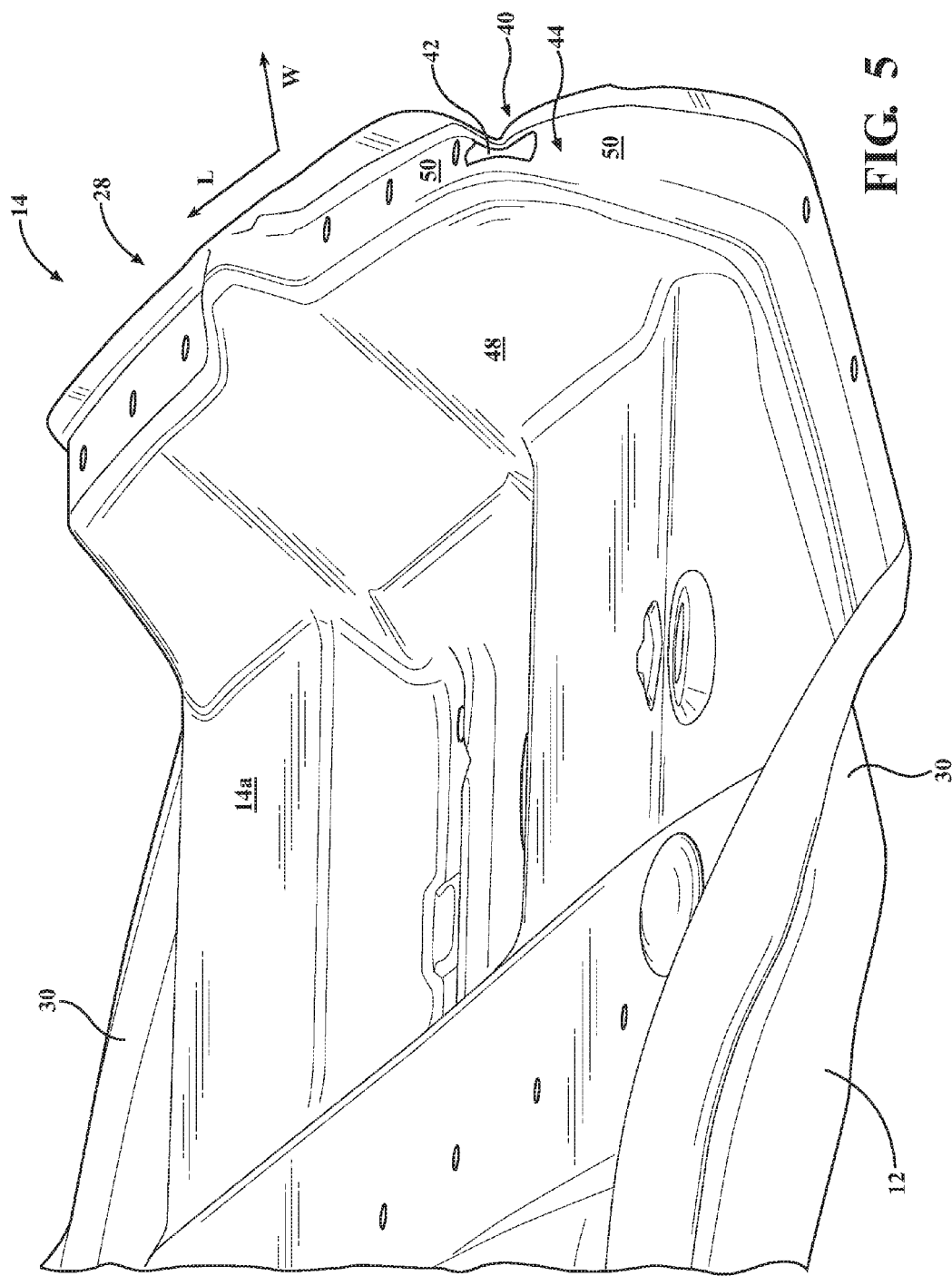
FIG. 5 is a view of FIG. 4 showing the contoured section being deformed.

With reference now to FIGS. 4 and 5, a perspective view of the first surface 15a of the frame 14 is provided. FIG. 4 shows the front edge portion 28 of the frame 14. The frame 14 includes a contoured section 40. The contoured section 40 is shown disposed adjacent the forward edge portion 22 of the frame 14. The contoured section 40 is spaced apart from the interior surface 18 of the outer panel 12 and adjacent the peripheral edge 20 of the outer panel 12. The contoured section 40 curves towards the interior surface 18 of the outer panel 12.

The frame 14 includes an opening 42 disposed on the contoured section 40 so as to facilitate a deformation of the outer panel 12 from a top down load. Thus, the opening 42 provides weaker structural stability to the outer panel 12 which in turn promotes deformation of the outer panel 12 subjected to a top down load.

The contoured section 40 is shown disposed adjacent the peripheral edge 20 of the outer panel 12. The contoured section 40 includes a wall 44. The wall 44 extends between a peripheral edge 20 and support portion 48 of the frame 14. As shown in FIGS. 3 and 4, the frame 14 includes a support portion 48 which is angled relative to the wall 44 and contiguous with the first cross member 36 and second cross members 38.

The wall 44 includes a generally planar surface portion 50 and contoured section 40 is contiguous to the planar surface portion 50. The contoured section 40 is dimensioned so as to curve towards the interior surface 18 of the outer panel 12. A second flange portion 54 is disposed on the distal edge of the wall 44, and projects upwardly as shown in FIGS. 4 and 5 so as to be generally orthogonal to the wall 44.

The opening 42 is disposed on the contoured section 40. The opening 42 is adjacent the periphery of the frame 14. The opening 42 is illustratively shown as having a rectangular dimension. The opening 42 has a length as defined by the length of the wall 44 as measured by the axis extending between the opposite sides of the hood assembly 10, and a width as defined by the width of the wall 44 as measured by the axis extending between the forward edge portion 22 and rear portion 26 of the hood assembly 10. The length and width are referenced in FIGS. 4 and 5 as "L" and "W" respectively.

Figure 7:
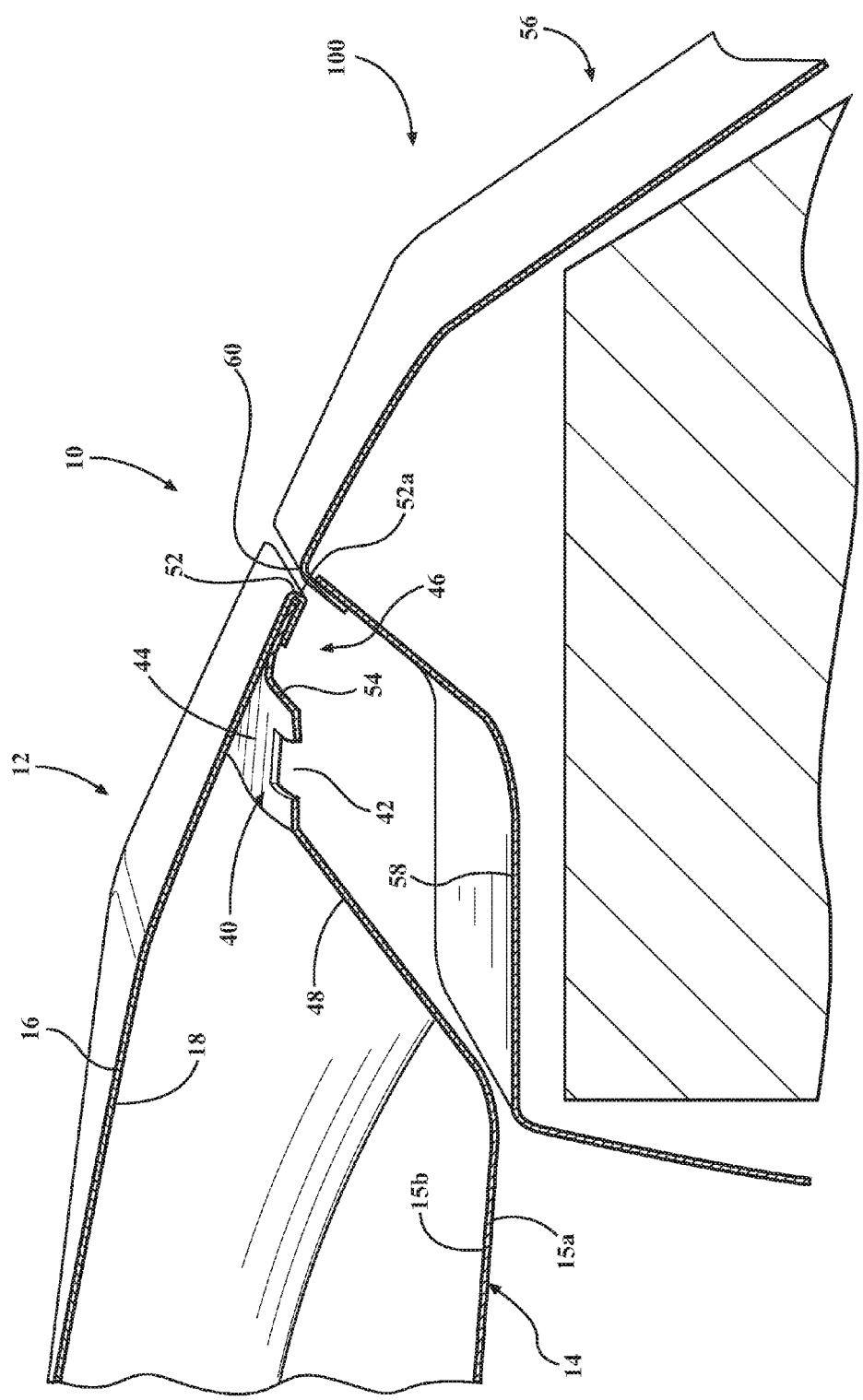
FIG. 7 is a cross-sectional view of FIG. 6 taken along line 7-7.
Figure 8:
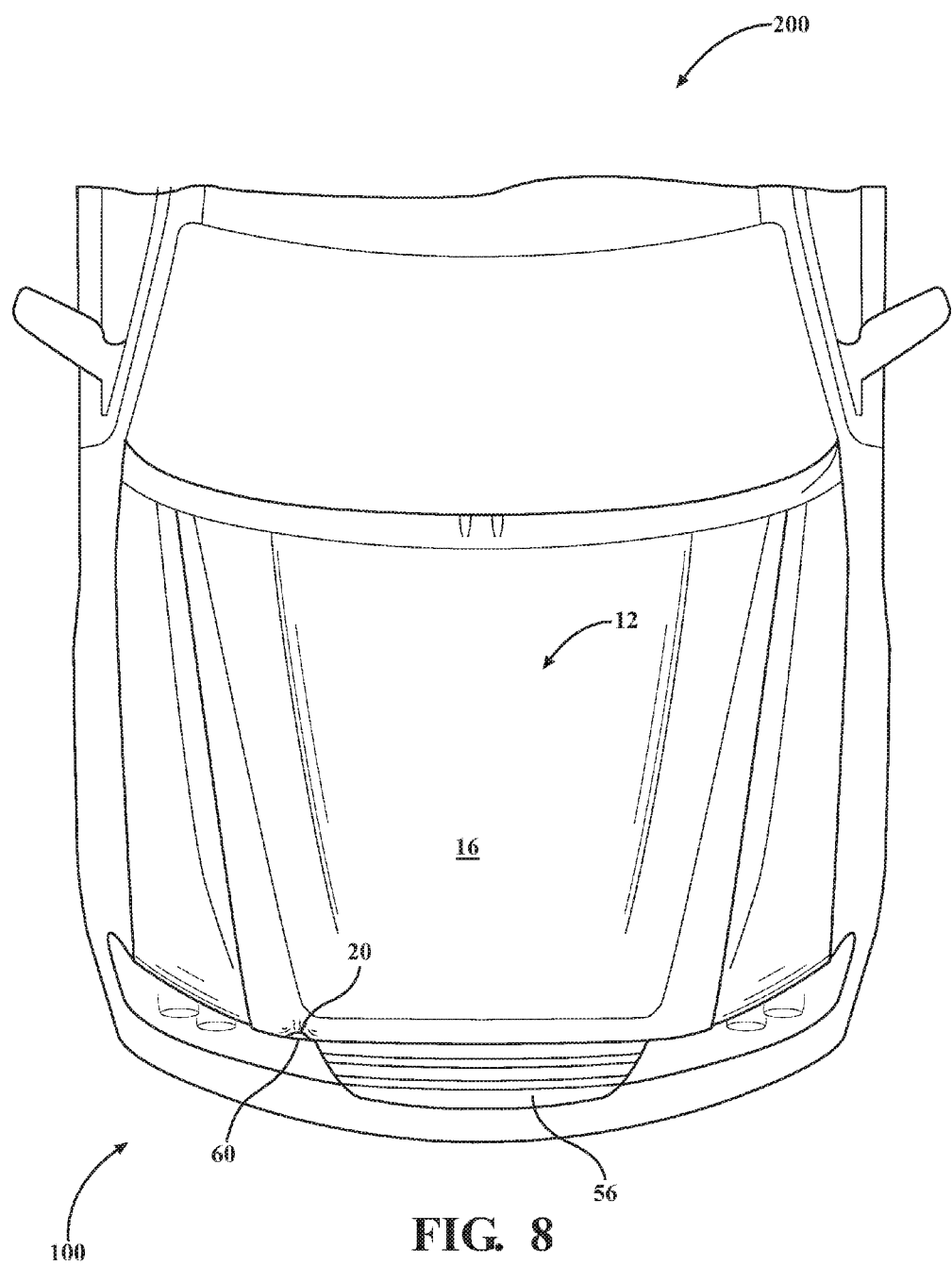
FIG. 8 is a top down view of the hood assembly showing the outer panel deformed.

With reference now to FIG. 7, a cross-sectional view of a hood assembly 10 is provided. A flange of the outer panel 12 may be folded over a distal edge of the frame 14 so as to define a hemming 46. For instance, the outer panel 12 includes a first flange portion 52. The first flange portion 52 is disposed on the peripheral edge 20 of the outer panel 12. The first flange portion 52 may include an end wall 52a and a lower wall 52b. The end wall 52a is generally orthogonal to the outer panel 12 and the lower wall 52b extends orthogonally from a distal end of the end wall 52a so as to form a u-shaped cross-section. The frame 14 includes a second flange portion 54. The second flange portion 54 of the frame 14 is seated within the u-shaped cross-section first flange portion 52 so as to define the hemming 46, as shown in FIG. 7. The contoured section 40 is contiguous with the hemming 46. The second flange portion 54 and the first flange portion 52 may be fixed to each other using a mastic adhesive.

The hood assembly 10 may include a plurality of contoured sections 40 which provide structural support for an opposing surface of the outer panel 12. The openings 42 may be formed on any such contoured section 40 for which it is desirable to weaken the opposing surface of the outer panel 12. As shown in FIG. 3, the hood assembly 10 includes two contoured sections 40, each of which are disposed on opposite ends of the wall 44. Each of the contoured sections 40 include an opening 42, shown generally as having a rectangular shape.

Figure 6:
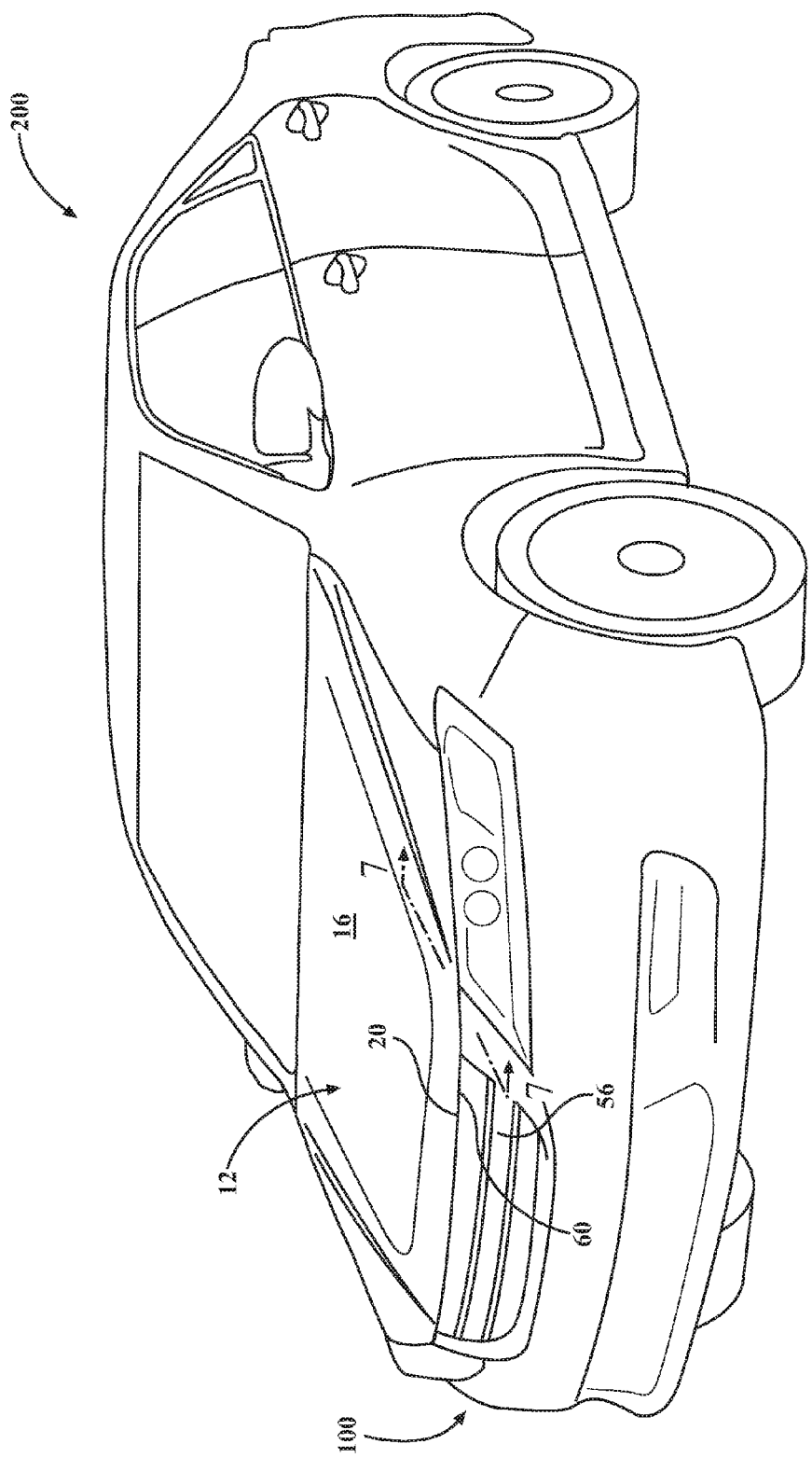
FIG. 6 is an illustrative view of a front end assembly.

With reference now to FIGS. 6 and 7, a front end assembly 100 is also provided. When mounted to an automotive vehicle 200, the front end assembly 100 forms the front of the automotive vehicle 200. The front end assembly 100 includes a grill 56 and the hood assembly 10 described above. The hood assembly 10 covers the engine compartment of the automotive vehicle 200.

The grill 56 is disposed at the front of the automotive vehicle 200 on a generally vertical plane. The grill 56 is generally orthogonal to the hood assembly 10. The grill 56 may be disposed forward of a radiator (not shown). An insulating layer (not shown) may be mounted on top of the radiator, and extend inwardly into the engine compartment so as to define a top surface 58 of the front end assembly 100 of the automotive vehicle 200. The grill 56 may further include a top edge 60 which is generally elevated relative to the top surface 58.

The front edge portion 28 of the frame 14 of the hood assembly 10 is configured to engage the top surface 58 of the front end assembly 100 of an automotive vehicle 200. The front edge portion 28 is configured to engage the top surface 58 so as to reduce noise caused by air flow. In addition having the front edge portion 28 engage the top surface 58 provides structural reinforcement between the front edge portion 28 of the hood assembly 10 and a hood lock (not shown) so as to reduce vibration between the hood assembly 10 and the hood lock when the automotive vehicle 200 is in motion.

The hood assembly 10 includes an outer panel 12 and a frame 14. The outer panel 12 may be formed of a generally rigid and durable material such as steel, or aluminum. However, it should be appreciated that other material such as fiberglass, carbon fiber or dry carbon may be used to construct the outer panel 12.

The frame 14 includes a contoured section 40. The contoured section 40 is shown disposed adjacent the forward edge portion 22 of the frame 14. The contoured section 40 is spaced apart from the interior surface 18 of the outer panel 12 and adjacent the peripheral edge 20 of the outer panel 12.

The frame 14 includes an opening 42 disposed on the contoured section 40 so as to facilitate a deformation of the outer panel 12 from a top down load. Thus, the opening 42 provides weaker structural stability to the outer panel 12 which in turn allows the outer panel 12 the ability to deform under a top down load.

The contoured section 40 is shown disposed adjacent the peripheral edge 20 of the outer panel 12. The contoured section 40 includes a wall 44. The wall 44 extends between a peripheral edge 20 of the frame 14 and a frame 14 body. As shown in FIGS. 3 and 4, the frame 14 body includes a support portion 48 which is angled relative to the wall 44 and contiguous with a front end 36a, 38a of the first cross member 36 and second cross members 38.

The wall 44 includes a generally planar surface portion 50 and an arcuate surface portion. The arcuate portion is dimensioned so as to curve towards the interior surface 18 of the outer panel 12. The distal edge of the frame 14 may project upwardly as shown in FIGS. 4 and 5 so as to be generally orthogonal to the wall 44.

The opening 42 is disposed on the arcuate surface portion of the contoured section 40. The opening 42 is adjacent the periphery of the frame 14. The opening 42 is illustratively shown as having a rectangular dimension. The opening 42 has a length as defined by the length of the wall 44 as measured by the axis extending between the opposite sides of the hood assembly 10, and a width as defined by the width of the wall 44 as measured by the axis extending between the front edge portion and rear edge portion of the hood assembly 10.

A flange of the outer panel 12 may be folded over a distal edge of the frame 14 so as to define a hemming 46. For instance, the outer panel 12 includes a first flange portion 52. The first flange portion 52 is disposed on the peripheral edge 20 of the outer panel 12. The first flange portion 52 is generally coplanar with the outer panel 12. The wall 44 of the frame 14 includes a second flange portion 54. The first flange portion 52 is folded over a portion of the second flange portion 54 of the frame 14 so as to define the hemming 46. The contoured section 40 is contiguous with the hemming 46.

The hood assembly 10 may include a plurality of contoured sections 40 which provide structural support for an opposing surface of the outer panel 12. The openings 42 may be formed on any such contoured section 40 for which it is desirable to weaken the opposing surface of the outer panel 12. As shown in FIG. 3, the hood assembly 10 includes two contoured sections 40, each of which are disposed on opposite ends of the wall 44. Each of the contoured sections 40 include an opening 42, shown generally as having a rectangular shape.

In operation, the contoured section 40 provides additional structural reinforcement to the portion of the outer panel 12 for which the contoured section 40 supports. The opening 42 weakens the structural support of the contoured section 40 thus softening the rigidity of the outer panel 12, allowing the outer panel 12 to exhibit a predetermined deformation upon a top down load. A desired deformation under certain top down load conditions may be achieved by tuning the size and dimension of the opening 42.

Obviously, many modifications and variations of the embodiments described herein are possible in light of the above teachings and may be practiced otherwise then as specifically described while within the scope of the appended claims.

What is claimed is:

1. A hood assembly comprising:
an outer panel having an interior surface and a peripheral edge;
a frame mounted to the outer panel, the frame having a contoured section, the contoured section spaced apart from the interior surface of the outer panel and adjacent the peripheral edge, the frame having an opening, the opening bound by a peripheral edge of the frame, the opening disposed on the contoured section so as to facilitate a deformation of the outer panel from a top down load.

2. The hood assembly of claim 1, wherein the contoured section includes a wall, the wall extending between the peripheral edge and a support portion of the frame, the support portion being angled relative to the wall.

3. The hood assembly of claim 2, wherein the outer panel includes a first flange portion, the wall of the frame includes a second flange portion, the first flange portion is folded over the second flange portion of the wall so as to define a hemming, the contoured section contiguous with the hemming.

4. The hood assembly of claim 3 wherein the wall is generally orthogonal to the second flange portion.

5. The hood assembly as set forth in claim 3, wherein a center of the frame 14 may include a plurality of cut outs, defining a first cross member extending between opposite sides of the frame, and a plurality of second cross members each of the plurality of second cross members spaced apart from each other.

6. The hood assembly as set forth in claim 5, further including a support portion, the support portion is angled relative to the wall and is contiguous with a front end of each of the plurality of first and second cross members.

7. The hood assembly of claim 1 wherein the opening is generally rectangular in shape.

8. The hood assembly of claim 1 wherein the contoured section is a pair of contoured sections, each of the pair of contoured sections disposed on opposite sides of the frame and adjacent a forward edge portion of the outer panel, each of the pair of contoured sections having an opening.

9. The hood assembly of claim 5 wherein each of the openings is rectangular in shape.

10. The hood assembly as set forth in claim 4, wherein the wall includes a generally planar surface portion and an arcuate surface portion, the arcuate portion is dimensioned so as to curve towards an interior surface of the outer panel.

11. The hood assembly of claim 1, wherein the opening has a length as measured by an axis extending between the opposite sides of the frame, and a width as measured by an axis extending between the front edge portion and rear edge portion of the frame.

* * * * *